US005528282A

United States Patent [19]
Voeten et al.

[11] Patent Number: 5,528,282
[45] Date of Patent: Jun. 18, 1996

[54] VIDEO SERVER FOR VIDEO-ON-DEMAND SYSTEM WITH CONTROLLABLE MEMORIES AND WITH PAUSE, FAST-FORWARD AND REWIND FUNCTIONS

[75] Inventors: Bart F. Voeten, Beerse; Christophe D. G. Vermeulen, Ramegnies-Chin; Frank O. Van der Putten, Lede; Frank C. M. Defoort, Aartselaar, all of Belgium

[73] Assignee: Alcatel N.V., Rijswijk, Netherlands

[21] Appl. No.: 245,951

[22] Filed: May 19, 1994

[30] Foreign Application Priority Data

May 19, 1993 [EP] European Pat. Off. .............. 93870085

[51] Int. Cl.⁶ .................................................. H04N 7/173
[52] U.S. Cl. .................... 348/7; 348/13; 455/4.2
[58] Field of Search .................... 348/7, 12, 13; 455/4.2, 5.1; 358/86; 395/200, 425; H04N 7/173, 7/16

[56] References Cited

U.S. PATENT DOCUMENTS

| | | | |
|---|---|---|---|
| 4,638,381 | 1/1987 | Vaughn | 360/51 |
| 4,647,986 | 3/1987 | Vaughn et al. | 360/35.1 |
| 4,674,064 | 6/1987 | Vaughn | 364/900 |
| 4,688,106 | 8/1987 | Keller et al. | 358/342 |
| 4,797,755 | 1/1989 | Baldwin et al. | |
| 4,956,768 | 9/1990 | Sidi et al. | 395/200 |
| 4,987,489 | 1/1991 | Hurley et al. | 358/105 |
| 5,014,125 | 5/1991 | Pocock et al. | 348/7 |
| 5,161,221 | 11/1992 | Van Nostrand . | |
| 5,214,639 | 5/1993 | Henrion . | |
| 5,341,474 | 8/1994 | Gelman et al. | 395/200 |
| 5,396,339 | 3/1995 | Stern et al. | 358/342 |
| 5,414,455 | 5/1995 | Hooper et al. | 348/7 |
| 5,416,508 | 5/1995 | Sakuma et al. | 348/7 |

FOREIGN PATENT DOCUMENTS

| | | |
|---|---|---|
| 0446493 | 9/1991 | European Pat. Off. . |
| 0529684 | 3/1993 | European Pat. Off. . |
| 0544975 | 6/1993 | European Pat. Off. . |
| 3633165 | 4/1987 | Germany . |
| 2248322 | 4/1992 | United Kingdom . |
| 9007184 | 6/1990 | WIPO . |
| 9102420 | 2/1991 | WIPO . |
| 9211713 | 7/1992 | WIPO . |

OTHER PUBLICATIONS

"Datamesh—Parallel Storage Systems for the 1990s", J. Wilkes, *11th IEEE Symposium on Mass Storage Systems—Crisis in Mass Storage*, Oct. 7–10, 1991, Monterey CA, pp. 131–136.

"A Store–And–Forward Architecture for Video–On–Demand Service", A. Gelman et al, *IEEE International Conference on Communications*, Jun. 23–26, 1991, Denver, pp. 0842–0846.

(List continued on next page.)

*Primary Examiner*—Safet Metjahic
*Assistant Examiner*—Chris Grant
*Attorney, Agent, or Firm*—Ware, Fressola, Van Der Sluys & Adolphson

[57] ABSTRACT

The present invention relates to a video server (DS) for transmitting video signals (VS) to user stations in response to the receipt of control signals issued by these user stations and including a plurality (HDA) of memories (HDASA, HDASB) which are controlled by a plurality of memory controllers (OBC, SCSIC-A/B). The memory controllers are controlled based on the control signals by a server control means (DSC, PCM1/PCMN) which includes a server controller (DSC) and a plurality of program control modules (PCM1/PCMN) each of which is associated with a subset (HDA1/HDAN) of the plurality (HDA) of memories (HDASA, HDASB) and to a subset of the plurality of memory controllers (OBC, SCSIC-A/B). This server control means is kept relatively simple if the server controller activates for each requested video signal the program control module in which associated subset of memories this video signal is stored and if this program control module, upon being activated, operates its associated memory controllers to achieve the transmission.

10 Claims, 4 Drawing Sheets

OTHER PUBLICATIONS

"System architecture for a large scale video on demand service", W. Sincoskie, *Computer Networks and ISDN Systems 22* (1991) North Holland, pp. 155–162.

"Strength (and Safety) in Numbers", M. Anderson, *BYTE*, Dec. 1990, pp. 337–339.

"Maximizing Performance in a Striped Disk Array", P. Chen et al, *Proc. 17th Annual Int'l Symposium on Computer Architecture*, May 1990, Seattle, pp. 322–331.

"Architectural Design of On–Demand Video Delivery Systems: The Spatio–Temporal Storage Allocation Problem", R. Ramarao et al, ICC '91, pp. 506–510.

"Hierarchical Distribution of Video with Dynamic Port Allocation", T. Yum, *IEEE Transactions on Communications*, vol. 39, No. 8, Aug. 1991, pp. 1268–1274.

"Application of the Multipath Self–Routing Switch in a Combined STM/ATM Cross–Connect System", B. Pauwels et al, *ISS '92*, Yokohama, pp. 1–13.

"A Multi–Ported Memory Array Optimized for Sequential Transfers", Anonymous, Research Disclosure 33089, Oct. 1991, No. 330, Emsworth, GB.

FIG.1

MAM

VIDEO SERVER FOR VIDEO-ON-DEMAND SYSTEM WITH CONTROLLABLE MEMORIES AND WITH PAUSE, FAST-FORWARD AND REWIND FUNCTIONS

TECHNICAL FIELD

The present invention relates to a video server for transmitting video signals to user stations in response to the receipt of control signals issued by said stations and including a plurality of memories controlled by a plurality of memory controllers and server control means controlling said plurality of memory controllers based on said control signals.

BACKGROUND OF THE INVENTION

Such a video server is already known in the art, e.g. from the article "A store-and-forward architecture for video-on-demand service" by A. D. Gelman et al, Proc ICC '91, June 1991, pp. 842–846 and is referred to therein as an information warehouse.

The architecture proposed for the video server and shown in FIG. 3 of the article requires the use of a server control means, constituted by the IWH service processor, which is relatively complex because it has to perform both an over-all control, i.e. call handling, routing, billing, etc., as well as an individual control of the transmission of each video signal. The article thus fails to account for the fact that the latter control is very elaborate for the reasons considered in more detail hereafter.

Firstly, for the video server to be feasible, the storage of each video signal has to be distributed over a number of separately controlled memories. Indeed, on the one hand, do state of the art memories and digital video coding techniques do not allow video signals exceeding a certain length to be stored in a single such memory. On the other hand can it also be verified from the article "System architecture for a large scale video on demand service", by W. Sincoskie, Computer Networks and ISDN Systems 22, 1991, 155–162, that for "near video on demand" a better service, i.e. smaller waiting times, is only possible by spreading the storage of a video signal over a number of such memories.

Secondly, to provide the "interactive video on demand" service as defined in the first referenced article, the server control means in the known video server needs to handle not only a relatively large number of "interactive" control signals but has also to react to them by controlling each of the memory controllers accordingly. This control is particularly complex when, as stated above, the storage of the involved video signals is spread over various memories and the known server control means further needs to map the above control signals to the exact memory configuration in use in the video server.

Hence, from the above it may be concluded that, when in the known video server the server control means is kept relatively simple, the freedom with which the storage of the video signals may be spread over the memories is restricted which clearly leads to a loss of functionality.

DISCLOSURE OF INVENTION

An object of the present invention is accordingly to provide a video server of the above known type, but which puts almost no restrictions on the way in which video signals are stored in the memories whilst still allowing the use of a relatively simple server control means.

This object is achieved due to the fact that said server control means according to the present invention includes a plurality of program control modules each of which is associated to a subset of said plurality of memories and to a subset of said plurality of memory controllers and a server controller activating said program control modules to transmit video signals stored in their associated subset of memories, and said program control modules operating at least one of said associated memory controllers to achieve said transmission.

In this way the server control means is split in a centralized server controller and a layer of distributed program control modules which perform the aforementioned control of the transmission of each video signal, i.e. all low level memory handling procedures needed to control the memory controllers inclusive of the interactivity control. If the storage of each video signal is distributed within one of the subsets of memories, the centralized server controller only has to perform the aforementioned over-all control of the video server, i.e. high level call handling procedures including the activation of the program control modules.

In view of the above, the invention can also be appreciated as being based on the insight that, in mapping the tasks of the video server in the above way on a modular server control means, the latter control means no longer has to be complex due to the storage of a video signal being spread over a number of memories. Indeed, as long as such spreading is done within the subset of memories associated to a same program control module, it only influences these program control modules which can without difficulty be adapted to a size of these subsets of memories large enough to provide full video server functionality.

It is to be noted that the above freedom with which video signals can be assigned to memory locations provided in the video server can also be used to waste as little memory in the server as possible.

A further feature of the present invention is that said server controller includes translation tables specifying for each of said video signals in which one of said subsets of memories it is stored, said control signals including request signals for requesting the transmission of one of said video signals to one of said user stations, said server controller handling each said request signal by deriving from said translation tables the subset of memories in which said requested video signal is stored and by sending, to the program control module associated to this subset, an activation signal including an identifier of said requested video signal and an identifier of said requesting user station.

In so doing, the above distribution of tasks within the server control means is specified in an advantageous way with respect to the server controller. Indeed, it can be seen from the above that through the use of the translation tables the server controller is completely isolated from the way in which the video signals are physically distributed within the subsets of memories. After the server controller has derived the correct activation signal, i.e. has reserved resources for a particular video signal to be sent to a particular user station, the rest of the transmission process is completely controlled by the appropriate program control module.

Still a further feature of the present invention is that each of said program control modules includes a memory allocation table specifying for each video signal stored in said associated subset of memories in which memories of this subset respective portions of said video signals are stored, each of said program control modules handling said activation signals by deriving from its memory allocation table the memories in which said portions of said requested video signal are stored and by sending playback signals to said associated memory controllers such that specific ones of said portions are retrieved by these memory controllers.

In so doing, the mentioned distribution is also specified in an advantageous way with respect to the program control modules. Indeed, this distribution of tasks is further distributed since the program control modules are, through the use of the allocation tables, isolated from the way in which the video signals are physically stored within the memories. Once the appropriate playback signals are derived, i.e. once the sequence in which the separate memory controllers have to be addressed is determined, the retrieval process itself can be completely handled by the separate memory controllers.

Yet another feature of the present invention is that said control signals further include interactive signals for modifying the sequence in which said requested video signal is transmitted to said requesting user station, said program control modules handling said interactive signals by modifying said playback signals for said requested video signal as a function of both said interactive signals and said memory allocation tables.

The interactive signals are thus directly handled by said program control modules and, as already mentioned, do not complicate the design of the server control means. The above feature shows that such a distribution of tasks can be best accomodated by the program control modules which store in their allocation tables exactly the information needed to respond to the interactive signals.

A feature exploiting the advantageous structure of the server control means even further is that to load a new video signal in said memories:

said server controller is adapted to select, based on said translation tables, one of said subsets of memories for storing said new video signal, to send upload signals to the program control module associated to said selected subset and to route said new video signal to this program control module; and, said program control modules are adapted to provide upon receiving said upload signals said new video signal to said memory controllers and to derive said playback signals based on said allocation tables so that these controllers are controlled to write said new video signal in appropriate memory locations.

As can be verified from the co-pending U.S. application Ser. No. 08/246,182, filed May 19, 1994, claiming priority from European Patent Application of even date and entitled "Video on demand network" (EPO Application 93870084.6) such an upload process is vital for the operation of the present video server when it is used as a distributed server.

The above feature allows this upload process to be implemented in an advantageous way since again it does not complicate the design of the server control means. Indeed, the most important part of this process which comprises allocating optimal memory locations to the new video signal is performed by the program control modules which are ideally suited, via their allocation tables, to determine how best to physically distribute the new video signal over the memories. The server controller then only has to decide in which program unit the new video signal is to be stored and is not complicated by the further implementation of the loading of a new video signal.

A further advantage of the above upload process is that the video signal is routed via the program control module itself to the memories since in this way the source of the new video signal can send this signal without updating its routing information as a function of which memory actually stores a specific portion of the video signal. Also the over-all control of the upload process is simplified thanks to the fact that the source needs only to take into account one program control module as communication partner.

Still further features of the present invention are that said video signals are stored as a plurality of data packets, said memory controllers being adapted to transmit said requested video signal as consecutive information packets each of which includes one of said data packets and said identifier of said requesting user station, and that said user stations and said video server are interconnected via a packet switching network using said identifier as routing control information.

In the above way it is obtained that the retrieval process is independent from the program control modules since the separate memory controllers in retrieving the video signal from the memories can transmit these packets directly to the input ports of the packet switching network.

Therefore, the program control modules only have to control the separate memory controllers without actually handling the video signals as well. This further distribution of the tasks of the video server leads to it being even more simple to design.

Another characteristic feature of the present invention is that said video server further includes multiplexing means adapted to multiplex said information packets up to the bitrate allowed on the input ports of said packet switching network and to apply said multiplexed information packets to said input ports via a media adapter transforming said information packets in packets able to be switched by said switching network.

It can be verified from the above that the video server can, thanks to the above feature, be easily adapted to packet switching networks able to switch any kind of packet format since this only requires the replacement of the media adapter. As can be seen from the above mentioned co-pending application such is particularly advantageous in the video on demand network disclosed therein as a video server can be provided for any type of access network without difficulty.

In order to provide memories which are well suited for use in the present video server, these memories are characterized in that said memory controllers are coupled via respective small computer systems buses to respective ones of said memories each including a plurality of random access memories with a single output for retrieving data stored therein.

In this way memories are provided in which memory optimization, such as, e.g., No. 93870086.2 described in the co-pending U.S. application Ser. No. 08-246182 claiming priority from European Patent Application of even date and entitled "Video server memory management method", can to a large extent be achieved by distributing video signals over a number of random access memories without requiring the cooperation of a large number of separate memory controllers.

This is furthermore achieved by using available computer technology, i.e., buses according to the well known Small Computer Systems Interface SCSI, memory controllers for these known buses and hard disks such that advantage can be drawn from the research efforts made by computer industry in improving this equipment.

Still another characteristic feature of the present invention is that a plurality of said video signals stored within one of said subsets of memories are linked in the said memory allocation table of one of said program control modules associated to said one subset of memories, and that said one program control module is adapted to modify said playback signals in response to at least one of said interactive control signals such that the retrieval for said requesting user station of the currently requested one of said linked video signals is substituted by the retrieval of another one of said linked video signals.

The above linking of video signals is for instance useful in linking a large number of short news flashes or video clips since then the user station can, without having to set up new calls for each new video signal it requests, form his own tailor-made news session by roaming within the mentioned plurality of linked video signals.

In the above way, such a service is particularly advantageously provided since the linking of video signals can be done within a single subset of memories and hence can be implemented using the program control modules which naturally allow the new type of interactive signals to be handled without overly complicating the design of the server control means.

The principle of the above service is further used to improve the interactive video on demand service relating to a same program, e.g., a motion picture, according to the following characteristic feature of the present invention, namely that each of said linked video signals relates to distinct display types of a same program, and that in the said memory allocation table, also specific points of these linked video signals relating to the display of a same part of said program are linked, and that said one program control module modifies said playback signals such that said retrieval of said other one of said linked video signals is taken up at the specific point of said other one video signal linked to the specific point at which retrieval of said current one of said video signals is halted.

The mentioned other display types correspond for instance to commonly available VCR-features such as visual fast forward and visual rewind. Providing these features by adapting the retrieval process of the basic video signal is not feasible as this video signal and the retrieval thereof are specifically adapted to the retrieval of the video signal for the normal display type.

The above feature thus can be appreciated as based on the insight that in providing special video signals, each relating to a specific display type and configured in such a way that the normal retrieval process leads to this specific display type at the user station, and in linking these video signals in the above way full VCR features may be provided without rendering the control of the video server more complex.

These and other objects, features and advantages of the present invention will become more apparent in light of the detailed description of a best mode embodiment thereof, as illustrated in the accompanying drawing.

BEST MODE FOR CARRYING OUT THE INVENTION

This video server DS is used as distributed server in a video on demand network as disclosed in the above-mentioned co-pending U.S. patent application Ser. No. 08/246,180 claiming priority from European Patent Application 93870084.6 of even date and entitled "Video on demand network".

Figure 1:
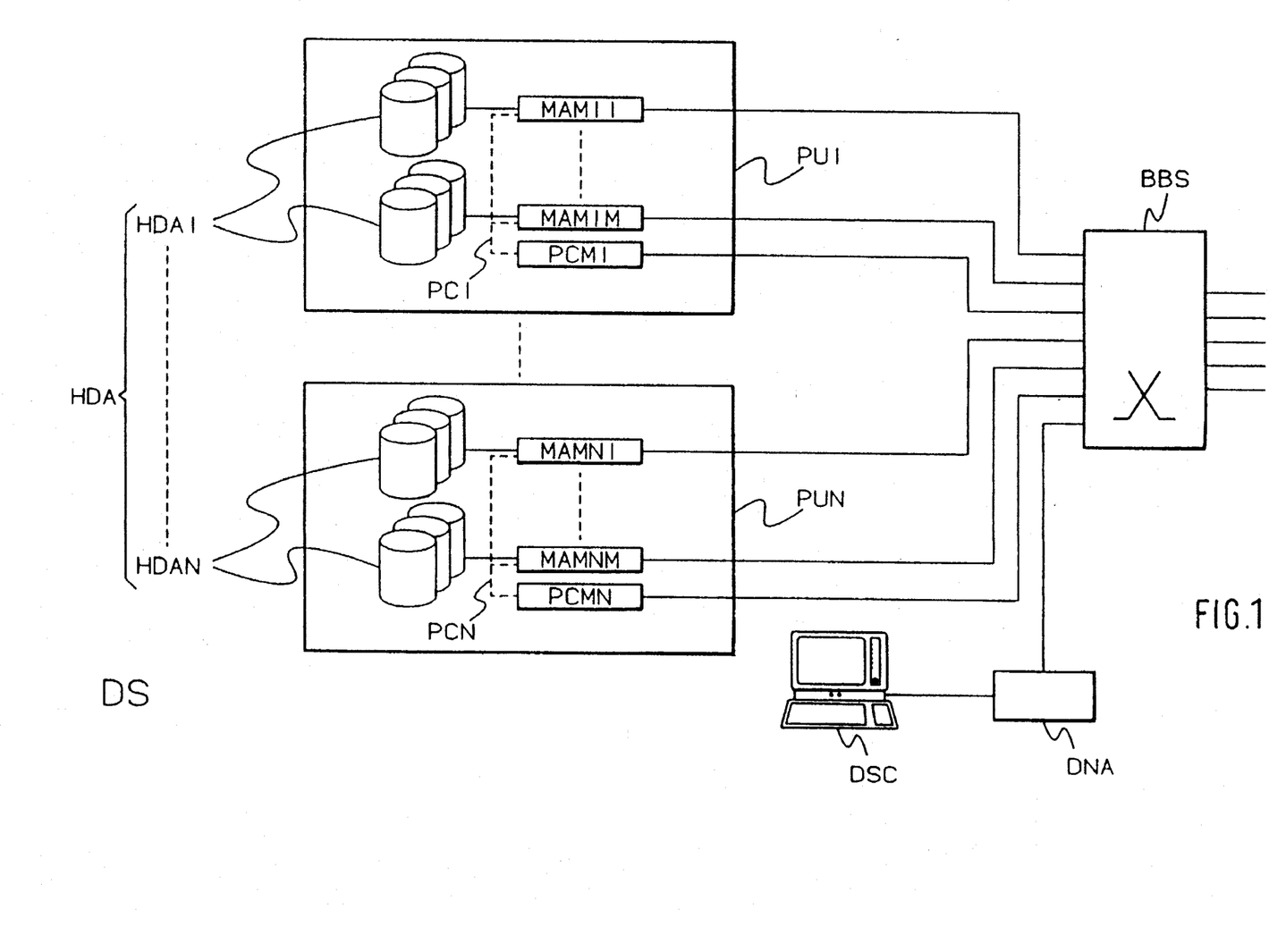
FIG. 1 represents a video server DS, according to the present invention.

The video server DS includes a broadband switch BBS, a server controller DSC connected to an input port of BBS via a network adapter DNA, and N program units PU1 to PUN connected to other input ports of BBS which output port that are coupled to user stations (not shown) as shown in the last mentioned co-pending application U.S. Ser. No. (Atty Docket No. 902-318). Each of the program units PU1 to PUN includes a plurality of media adapter modules, MAM11/MAM1M to MAMN1/MAMNM, an associated program control module, PCM1 to PCMN, and an associated subset, HDA1 to HDAN, of a plurality HDA of hard disks. In these hard disks video signals are stored according to a format described in detail later with reference to FIG. 4.

Each plurality of adapter modules MAM11-1N/MAM1N-NM of a program unit PU1/PUN is controlled by the associated program control module PCM1/PCMN of this program unit PU1/PUN via a respective program control line PC1/PCN to read video signals from the associated subset of hard disks HDA1/HDAN and further adapted to convert the retrieved video signals to a format able to be switched by this switch BBS. It is to be noted that a similar conversion is performed by the network adapter DNA to allow the server controller DSC to communicate via the broadband switch BBS.

With the above description in mind the operation of the video server DS can be explained with regard to the high level control performed by the distributed server controller DSC. As described in detail hereafter this control primarily consists in setting up calls with user stations (not shown) and in allocating resources, within the switch BBS as well as within the video server DS, to such calls. Other related functions of DSC do not fall within the scope of the present invention but are described in some more detail in the last mentioned co-pending U.S. application Ser. No. 08/246,180.

DSC sets up a call to one of the user stations only after a control signal requesting transmission of one of the video signals stored in the video server DS has been received from this user station by this controller DSC. For servicing this request the latter controller DSC includes translation tables (not shown) which map these video signals onto the program units PU1/PUN in which they are stored in their entirety, and DSC thus derives from these tables the identity of the program unit PU1/PUN in which the requested video signal is stored and also derives information regarding the availability of resources for retrieving the requested video signal from this program unit. If the broadband switch BBS is for instance an Asynchronous Transfer Mode or ATM network, the controller DSC further also allocates resources in this switch BBS by reserving a certain amount of bandwidth for this call and by determining routing control information under the form of a Virtual Connection Identifier VCI, as is well known in the art.

After having performed these operations the server controller DSC transmits an activation signal including the allocated VCI, designating the requesting user station, and the identity of the requested video signal via the broadband switch BBS to the program control module PCM1/PCMN of the program unit PU1/PUN in which the latter video signal is stored. From then on the call is handled by the latter program control module until the latter at the end transmits a "call completed" signal to the server controller DSC which in response releases all allocated resources.

Figure 2:
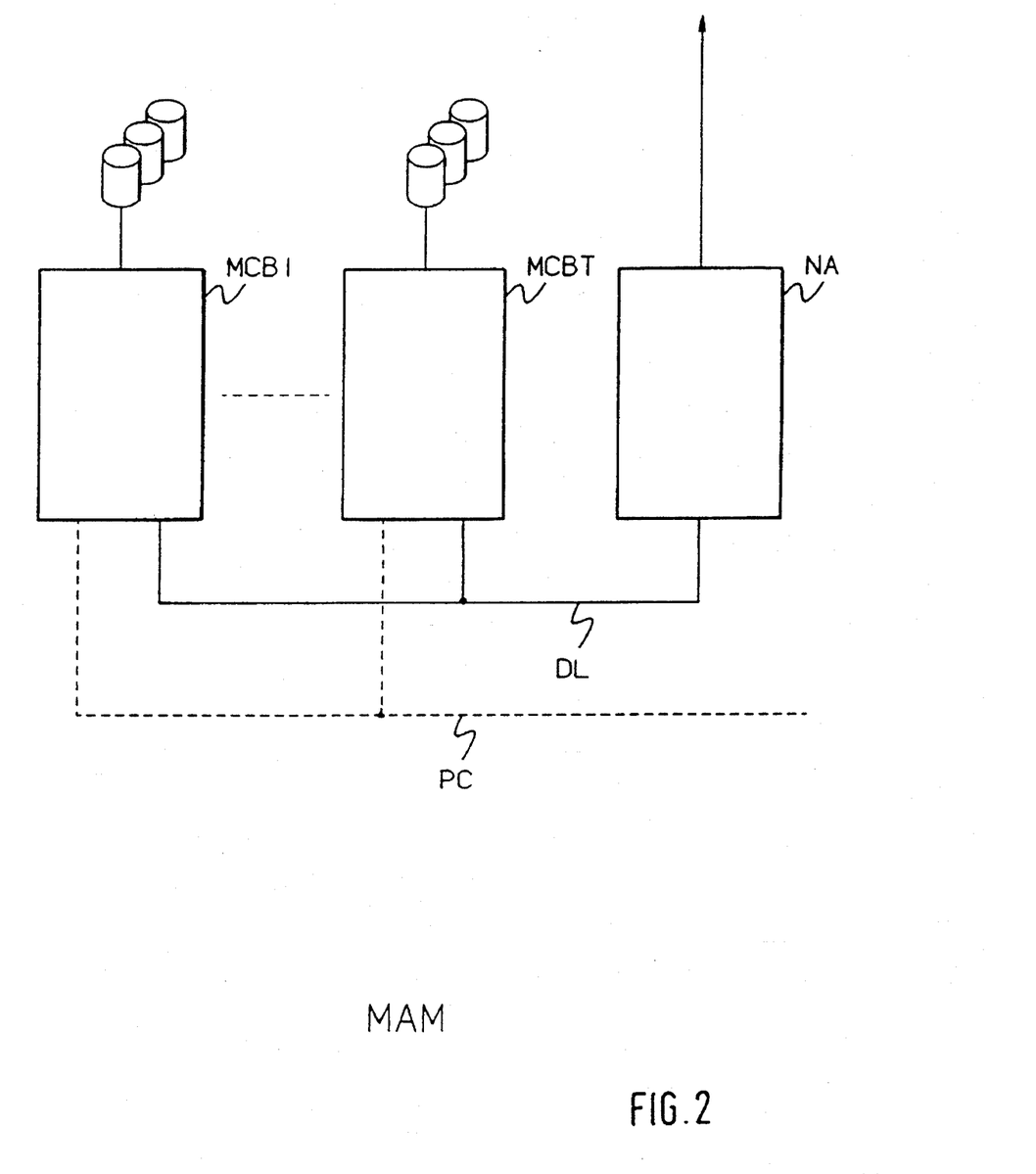
FIG. 2 depicts in more detail the structure MAM of media adapter modules MAM11/MAMNM of the server DS of FIG. 1.

In order to be able to clarify the way in which the program control modules PCM1/PCMN achieve the transmission of a video signal upon receiving the aforementioned activation signal, first FIG. 2, showing the general structure MAM of the above media adapter modules MAM11/MAMNM is described in more detail.

Figure 3:
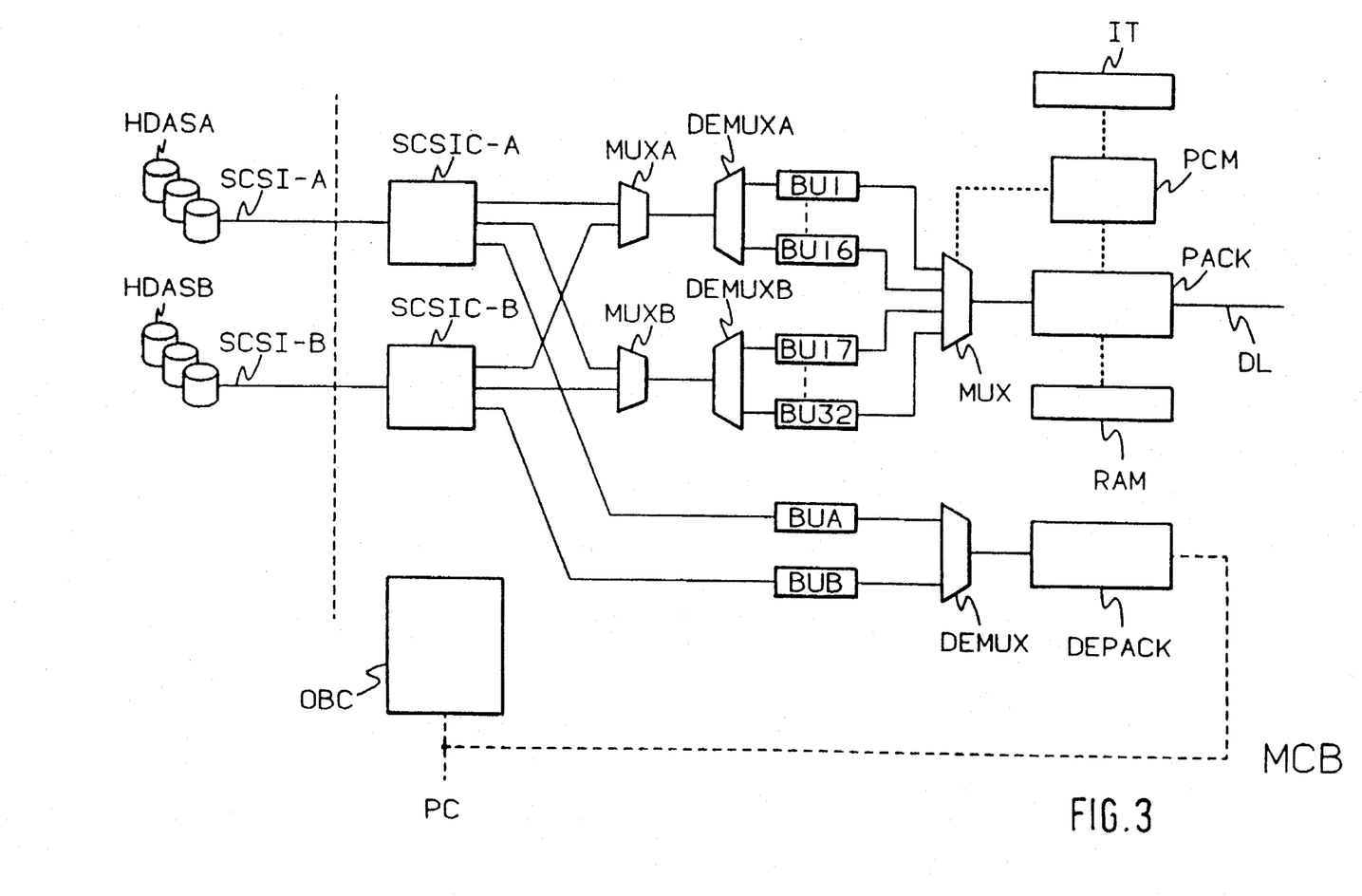
FIG. 3 depicts in more detail the structure MCB of a media control board MCB1/MCBT used in the media adapter module MAM of FIG. 2; and, FIG. 4 shows a format in which video signals VS are stored in memories HDA of the video server DS of FIG. 1.

Each media adapter module MAM, i.e. MAM11 to MAMNM, includes a plurality of T media control boards MCB1/MCBT each comprising a number of circuits, depicted in FIG. 3, mounted on a same printed circuit board and a network adapter NA also mounted on a printed circuit board. The boards MCB1/MCBT and NA, as well as the program control modules PCM1/PCMN of FIG. 1, are plugged in a rack (not shown) in which a data line DL provides a bus-type interconnection between all the latter boards and in which a program control line PC, i.e. PC1/PCN, provides a similar bus-type interconnection of MCB1/MCBT and NA to the program control module, i.e. PCM1/PCMN, of the corresponding program unit, i.e. PU1/PUN.

The network adapter NA which, just as DNA, provides a format conversion, is connected to an input port of the broadband switch BBS as well as, via DL, to the media control boards MCB1/MCBT so as to be able to handle a bitstream at a bitrate which is as close as possible to the maximum bitrate allowed on this input port. As is explained in more detail with reference to FIG. 3, the media control boards MCB1/MCBT are further also each connected to a number of hard disks such as HDASA and HDASB.

With respect to this structure MAM of media adapter modules MAM11/MAMNM, the operation of the program control modules PCM1/PCMN required to achieve the transmission of a requested video signal and performed subsequent to receipt of the above mentioned activation signal from DSC is described hereafter.

The program control module PCM1/PCMN receiving such an activation signal first consults a memory allocation table (not shown) mapping each of the video signals stored in the corresponding program unit PU1/PUN onto the memory locations within the corresponding plurality of hard disks HDA1/HDAN in which this video signal is stored. This program control module PCM1/PCMN then starts the transmission process by applying playback signals on the corresponding program control line PC1/PCN. These playback signals include at least an address of the media control board MCB1/MCBT connected to the hard disks on which a first portion of the requested video signal is stored as well as the above VCI routing information to be used by the broadband switch BBS and some other information relating to the locations in the latter hard disks in which the mentioned first portion of the video signal is stored. This other information will be described in more detail later after discussing, with reference to FIG. 4, the format in which the video signals are stored on the hard disks.

Upon receiving an above mentioned playback signal, the media control board MCB1/MCBT starts retrieving this first portion of the requested video signal and, after some transformation of the retrieved information such as adding the VCI routing information, applies the thus obtained information to NA via the data line DL. The adapter NA then converts the latter information into the format used by the broadband switch BBS and applies the converted information to this switch BBS. After transmission of this first portion is thus achieved, the media control board MCB1/MCBT signals this fact to its program control module PCM1/PCMN and the latter then reiterates the above procedure by applying to its program control lines PC1/PCN new playback signals, relating to a second portion of the video signal. This procedure is repeated until the complete video signal has been transmitted via the broadband switch BBS or until the requesting user station transmits a control signal cancelling further transmission to the program control module PCM1/PCMN in charge of the transmission. In both these cases the latter controller PCM1/PCMN transmits the above "call completed" signal to the server controller DSC.

In case interactive control of the transmission of the requested video signal is required by the requesting user station, the program control modules PCM1/PCMN also perform the function of handling the interactive control signals issued in this respect by the latter user station. These interactive control signals which are distinct from the above 'request' control signals are routed directly to the program control module PCM1/PCMN in charge of the transmission. To this end the server controller DSC also sets up a call from the requesting user station to this controller.

Upon receiving such an interactive control signal, e.g., fast forward, the program control module retrieves the state of actual transmission from the media control board MCB1/MCBT currently transmitting the requested video signal and derives therefrom based on its memory allocation table the impact of the interactive control signal on this transmission, i.e., it determines from which point in the video signal transmission should be taken up anew. Once this is achieved the above procedure is again started from the above identified point in the video signal by applying the appropriate playback signals to the program control line PC1/PCN.

A special case arises when the interactive control signal requests a visual fast forward or visual rewind of the requested video signal at predetermined speeds. According to a particular inventive feature these requests are handled by providing within the same program unit PU1/PUN special video signals each corresponding exactly to the distinct display types which may be requested by the user stations. These special video signals are such that in retrieving them in the same way as the other video signals the television set (not shown) in the user station displays the video signal exactly with the requested display type.

The latter special video signals are discussed in more detail later with reference to FIG. 4 and at the moment it suffices to note that the controllers PCM1/PCMN respond to such interactive video signals by applying playback signals which order the transmission of the appropriate special video signal starting at the appropriate point within this special video signal. To this end the memory allocation tables also link to each video signal for which distinct display types are supported a number of special video signals corresponding to these distinct display types and further link points in these linked video signals which correspond to the display of similar moments of, e.g., the motion picture represented by this video signal. It is to be noted that this particular feature can be implemented by a skilled person by using the details given in the present description.

Still a further function of the program control modules PCM1/PCMN arises when a new video signal has to be loaded in its corresponding program unit PU1/PUN. The server controller DSC first couples the source of this new video signal to one of the program control modules PCM1/PCMN which it selects with the help of its translation tables, i.e., DSC sets up a call by assigning a VCI to the connection between the source and the selected program control module.

Upon receiving from the server controller DSC an upload signal notifying the selected program control module that the new video signal has to be loaded in its program unit PU1/PUN, the latter controller PCM1/PCMN derives from its memory allocation table the identity of the memory locations of its associated plurality of hard disks HDA1/HDAN wherein the new video signal is to be stored. The selected controller PCM1/PCMN then applies on its program control line PC1/PCN the video signal received via the broadband switch BBS, for instance with the maximum bitrate allowed on the ports of this switch BSB, as well as playback signals instructing the media control boards MCB1/MCBT of its program unit PU1/PUN to store this video signal in the computed memory locations.

It is to be noted that the locations in which the new video signal is to be stored also depend upon the type of service with which the new video signal is to be provided to the user stations as described in the co-pending European U.S. application Ser. No. 08/246,182 corresponding to Patent 93870086.1 Application of even date and entitled "Video server memory management method".

FIG. 3 is hereafter described in detail allowing later on the write and retrieval processes performed by the media control boards MCB1/MCBT upon receiving the playback signals to be discussed in more detail.

As shown in this figure, the structure MCB of each of the media control boards MCB1/MCBT is such that each of these boards is coupled to two hard disk arrays HDASA/HDASB, each including from 1 to 7 hard disks, via respective buses SCSI-A/SCSI-B corresponding to the well known Small Computer Systems Interface standard SCSI-2 supporting a bitrate of maximum 80 Mbit/s.

To retrieve video signals from the hard disk arrays HDASA/HDASB the media control board MCB includes 2 individual controllers SCSIC-A/SCISIC-B, known as such and coupled to these arrays via respective ones of the buses SCSI-A/SCSI-B. Both SCSIC-A and SCSI-B are further connected to the inputs of 2-to-1 multiplexers MUXA/MUXB whose outputs are in their turn connected to the inputs of respective ones of 1-to-16 demultiplexers DEMUXA and DEMUXB. The sets of outputs of DEMUXA/DEMUXB are each connected to the inputs of a set of 16 read buffers, i.e. BU1–16 and BU17–32 respectively, whilst the outputs of these buffers BU1–32 are connected to the inputs of a 32-to-1 multiplexer MUX. Through its output MUX applies information to a packetizer PACK under the control of a pace control circuit PCM. The latter circuit PCM receives an internal clock signal from an internal timer IT and also controls the operation of the packetizer PACK. Finally, the packetizer PACK derives the information to be applied on the data line DL from the information supplied to it via MUX and from the contents of an associated memory RAM.

To write new video signals on the hard disk arrays HDASA/HDASB, a depacketizer DEPACK is included in the media control board MCB whose input is coupled to the program control line PC and which applies information received via PC to the input of a 1-to-2 demultiplexer DEMUX. The 2 outputs of this demultiplexer DEMUX are coupled to the inputs of two write buffers BUA/BUB whose outputs are coupled to respective ones of the individual memory controllers SCSIC-A/SCSIC-B.

Finally, the media control board MCB includes an on board controller OBC connected to the program control line PC and controlling in a not shown way all aforementioned blocks of MCB. The main function of the latter controller OBC is to interpret the playback signals received from the associated program control module PCM1/PCMN in such a way that the standard memory controllers SCSIC-A/SCSIC-B are operated correctly.

The operation of the media control boards MCB1/MCBT upon receiving playback signals addressing such a board will now be discussed in some detail.

Firstly, if these playback signals relate to the retrieval of data from the hard disk arrays HDASA/HDASB, the on board controller translates these signals into appropriate commands for the relevant individual memory controller SCSIC-A or SCSIC-B which then retrieves the required data. This data is applied via MUXA or MUXB and DEMUXA or DEMUXB to one of the buffers BU1–32 assigned by OBC to the call for which OBC to a specific call originating in MCB and correspond to a channel for a single user station with interactive control over the retrieval process or to a "near video on demand" channel which is multicast to a plurality of user stations without control over the retrieval process. To each of the buffers BU1–32 thus corresponds a specific VCI stored in a memory location of RAM assigned to this buffer.

It is to be noted that for the media control board MCB the number of such channels is restricted to 32 since the retrieval of data from the hard disks HDASA/HDASB for each such channel consumes a predetermined part of the limited amount of bandwidth provided via the buses SCSI-A/SCSI-B.

Data stored in the buffers BU1–32 is applied via MUX to the packetizer PACK which derives from this data an information packet including the VCI identifier stored in the memory RAM and associated to the buffer BU1–32 from which the latter data originate and which applies this information packet to the data line DL. The exact operation of PACK and particularly the control exerted by the pace control circuit PCM on PACK and MUX is discussed later referring to FIG. 4.

Secondly, if these playback signals relate to the loading of a new video signal on the hard disks HDASA/HDASB, the on board controller OBC operates the depacketizer DEPACK which then performs the inverse operation with respect to the packetizer PACK on the appropriate information supplied to it via the program control line PC. The output information thus produced by DEPACK has the video signal format shown in FIG. 4 and discussed later and is applied via DEMUX to either BUA or BUB depending on the hard disk array HDASA or HDASB in which this data is to be stored according to the associated playback signals. Based on these playback signals the on board controller OBC further generates commands for the relevant individual memory controller SCSIC-A or SCSIC-B which pursuant to these commands writes the data from either BUA or BUB on the appropriate memory locations, as computed by the program control module PCM1/PCMN.

Figure 4:
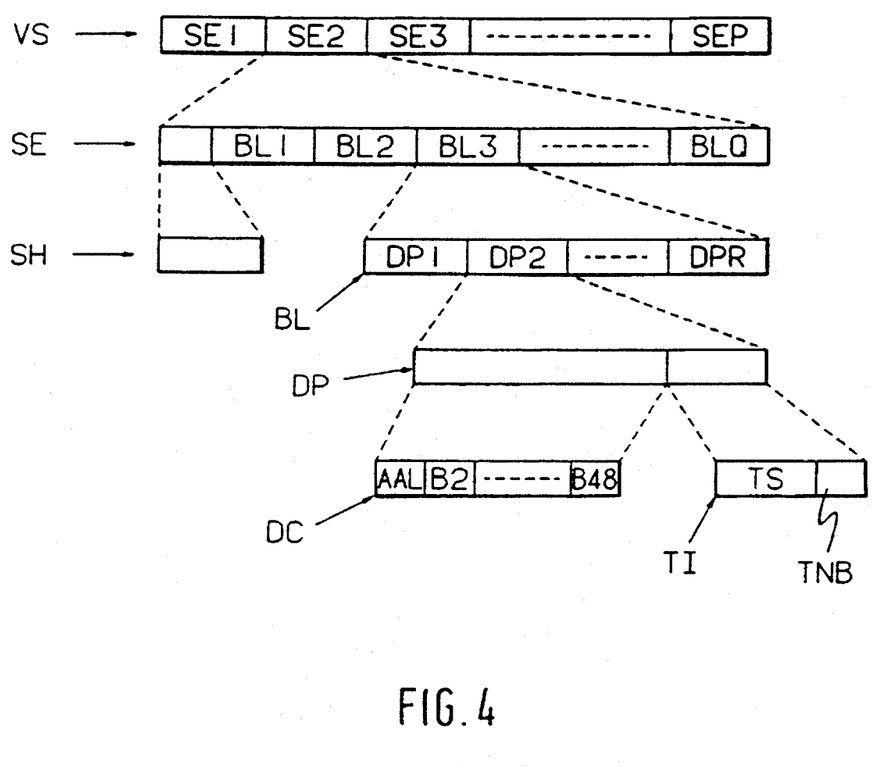

To allow the above retrieval and write processes to be described in still further detail the format of the video signals VS is now discussed hereafter by making reference to FIG. 4.

The digital video signal shown in this figure is obtained from a so called MPEG bitstream coded according to the coding method proposed by the Moving Pictures Expert Group (MPEG) and standardized by the International Standards Organisation ISO. This coding method aims at a transmission rate at up to about 1.5 Mbit/s but can also be used for coding rates such as 4 Mbit/s, which are already possible with state of the art technology.

To obtain the format shown the MPEG-coded bitstream is first further coded according to a proprietary code, e.g. a Reed-Solomon code. Together with an ATM Adaptation Layer byte AAL, each set of 47 consecutive bytes B2–48 of the thus coded bitstream constitutes the payload DC of a data packet DP which further includes timing information TI comprising a time stamp TS and a transfer next block bit TNB. A number R of data packets DP1/DPR constitute a block BL and a number Q of these blocks BL1/BLQ together with a segment header SH form a segment SE. Finally the video signal VS consists of a number P of segments or portions SE1/SEP, the latter number P being a function of the length of the video signal VS.

Each segment SE of such a video signal VS is stored in the hard disks of a single hard disk array, such as HDASA and HDASB, and according to one of the specific video server memory management methods disclosed in the last mentioned co-pending U.S. patent application Ser. No. 08/246,182 particularly in FIGS. 1–3 thereof, beginning at page 7, line 9 and continuing to page 12, line 23, which is hereby incorporated by reference for background, the specific method used for storing such a segment being provided by its segment header SH. In loading a video signal segment onto the hard disks HDASA/HDASB the playback signals thus include this segment header SH and further information needed to specify uniquely the locations in which the video signal VS has to be stored. The on board controller OBC controls DEPACK to strip all information except that of BL1/BLQ from the data supplied via PC and to add the segment header SH at the right place. This information is then stored in HDASA/HDASB pursuant to commands derived by OBC from the playback signals.

Retrieving the video signal VS from the hard disk arrays HDASA/HDASB is done on a block by block basis, each block BL having a length inferior to the size of the cache buffer (not shown) of the hard disks used, typically 1 Mbyte. Each block BL is retrieved from the above cache buffers at the maximum retrieval rate, i.e. 80 Mbit/s as imposed by the buses SCSI-A and SCSI-B, in order to exploit the multiplexing effect of these buses, each of the hard disks providing a maximum sustainable transfer rate of 20 Mbit/s.

This rate is higher than the real-time transmission rate and therefore unsuitable for on-line transmission to the user stations which expect the video signal VS at the real-time rate. Therefore a conversion of transmission rate has to be done before the block BL is transmitted by PACK. This is achieved by storing the retrieved blocks BL first in the appropriate buffer BU1–32 and by reading them out of this buffer at the real-time rate under control of the pace control circuit PCM. The real-time rate is defined via the timing information TI included in each data packet DP and used by PCM as explained hereafter.

The operation of the pace control circuit PCM has to be first considered when the first block BL1 of the first segment SE1 of the video signal VS is read in one of the read buffers BU1–32, for instance in BU1. The pace control circuit PCM controls MUX in such a way that the first data packet DP1 in BU1 is allowed to pass to the packetizer PACK as soon as possible. This packetizer PACK further handles the payload DC of this first data packet DP1 storing the timing information TI of this packet in a location of RAM assigned to BU1. For all further data packets DP2-R within segment SE1, PCM compares the time stamp TS stored in the last mentioned memory location of RAM with the value supplied to it by the internal timer IT and allows MUX to transfer a further data packet DP2-R only if the compared values are within a certain threshold range. The packetizer PACK, when receiving such a further data packet DP2-R, overwrites the previous value of TS with the value of TS included in this further data packet DP2-R.

The above procedure is iterated for consecutive blocks BL1-Q of segment SE1 until the packetizer PACK in analysing the transfer next block bit TNB finds that it is set to 1. This means that the corresponding data packet DP is the last data packet DPR of BLQ of the first segment SE1, and a segment completed signal is sent by PACK to OBC. If then the previous playback signal indicated that still more segments SE of the video signal VS are stored on the same MCB, OBC will take the appropriate measures to ensure that a next segment is also routed to BU1. The packetizer PACK and the pace control circuit PCM then continue operating as before for the data packets DP of this next segment SE. If a TNB relative to the last segment SE on this MCB is found, the on board controller OBC will send control signals over PC to its program control module PCM1/PCMN in such a way that the latter is able to initiate the retrieval of further segments SE of this video signal VS on other media control boards MCB and to synchronize the retrieval of the latter by initializing its RAM appropriately.

The packetizer PACK further forms an information packet (not shown) of each data packet DP handled by it by assembling the VCI identifier stored in the RAM as mentioned above with the payload DC of the latter data packet DP and applies this information packet on the data lines DL.

Finally, the way in which visual fast forward or rewind are provided with the present video server and video signal data format is discussed. As already mentioned above this is not achieved by retrieving the video signal VS at faster rates nor by retrieving it in a different sequence since this would be in conflict with the basic principles of the video server. Indeed, since a predetermined part of the bitrate available on one of the buses SCSI-A and SCSI-B is reserved for each channel, e.g. 4 Mbit/s, increasing this bitrate for one of the channels would either mean a reduction of the number of channels available from such a bus or a reduction of the bitrate of another channel which are both unexceptable. Also, in reversing the sequence with which the video signal VS is read from the plurality of hard disks HDA, the above transmission rate conversion cannot be applied.

Therefore, a special video signal, e.g., a 10 times faster visual fast forward signal, linked to the real-time video signal VS is stored within a same program unit PU1/PUN and interactive signals requesting such a visual fast forward are handled as described above by jumping to the requested point in this special video signal. The special video signal is obtained in such a way that its required transmission rate is not higher than the transmission rate of the video signal VS for instance by omitting inter-frame coded data included in the MPEG bitstream. For example, for a special video signal corresponding to a visual rewind, inter-frame coded data are also omitted, since they depend upon the sequence in which the MPEG data are played back, and the time stamps are calculated anew for the reasons set out above.

It is finally to be noted that the above special video signals are particularly advantageous when using the structure of the present video server DS since then the linking thereof to the video signal VS is achieved without complicating this video server DS thanks to the fact that such linking can be made within a same program unit.

While the principles of the invention have been described above in connection with specific apparatus, it is to be clearly understood that this description is made only by way of example and not as a limitation on the scope of the invention.

We claim:

1. Video server for transmitting video signals to user stations in response to receipt of control signals issued by said user stations, comprising: a plurality of memories controlled by a plurality of memory controllers; server control means for controlling said plurality of memory controllers based on said control signals, wherein said server control means comprises a plurality of program control modules each of which is associated with a subset of said plurality of memories and to a subset of said plurality of memory controllers and a server controller activating said program control modules to transmit video signals stored in said associated subset of memories, said program control modules operating at least one of said associated memory controllers to achieve the transmission of said video signals to user stations.

2. Video server according to claim 1, wherein said server controller includes translation tables specifying in which of said subsets of memories each of said video signals is stored, said control signals including request signals for requesting transmission of one of said video signals to one of said user stations, said server controller handling each said request signal by deriving from said translation tables the subset of memories in which said requested video signal is stored and by sending an activation signal, including an identifier of said requested video signal and an identifier of said requesting user station, to the program control module associated with the subset of memories storing the video signal.

3. Video server according to claim 2, wherein each of said program control modules includes a memory allocation table specifying where, in said associated subset of memories, said video signal is stored, each of said program control modules handling said activation signals by deriving from its memory allocation table the memories in which said requested video signal is stored and by sending playback signals to said associated memory controllers such that specific portions of said requested video signal are retrieved by these memory controllers.

4. Video server according to claim 3, wherein said control signals further include interactive signals for modifying a sequence in which said requested video signal is transmitted to said requesting user station, said program control modules handling said interactive signals by modifying said playback signals for said requested video signal as a function of both said interactive signals and said memory allocation tables.

5. Video server according to claim 3, wherein to load a new video signal in said memories said server controller is adapted to select, based on said translation tables, one of said subsets of memories for storing said new video signal, and to send upload signals and said new video signal to the program control module associated with said selected subset of memories; and, said program control modules are adapted to provide, upon receiving said upload signals, said new video signal to said memory controllers, and to derive said playback signals based on said allocation tables so that said memory controllers write said new video signal in appropriate memory locations.

6. Video server according to claim 3, wherein said video signals are stored as a plurality of data packets, said memory controllers being adapted to transmit said requested video signal as consecutive information packets each of which includes one of said data packets and said identifier of said requesting user station, and wherein said user stations and said video server are interconnected via a packet switching network using said identifier as routing control information.

7. Video server according to claim 6, wherein said video server further comprises: multiplexing means adapted to multiplex said information packets up to a bitrate allowed on input ports of said packet switching network and to apply said multiplexed information packets to said input ports via a network adapter that transforms said information packets into packets able to be switched by said switching network.

8. Video server according to claim 1, wherein said memory controllers are coupled via respective small computer systems buses, to respective ones of said memories each including a plurality of random access memories with a single output for retrieving data stored therein.

9. Video server according to claim 4, wherein a plurality of said video signals stored within one of said subsets of memories are linked in said memory allocation table of one of said program control modules associated with said one subset of memories, and wherein said one program control module is adapted to modify said playback signals in response to at least one of said interactive control signals, such that retrieval for said requesting user station of the currently requested one of said linked video signals is substituted by retrieval of another one of said linked video signals.

10. Video server according to claim 9, wherein each of said linked video signals relates to distinct display types of a same program, and wherein, in said memory allocation table, specific points of a first and second of said linked video signals for display of a same part of said program also linked, and wherein said one program control module modifies said playback signals to cause retrieval of said second linked video signal beginning at the specific point where retrieval of said first linked video signal is halted.

* * * * *